United States Patent
Weitzel et al.

(12) 
(10) Patent No.: US 6,531,538 B1
(45) Date of Patent: Mar. 11, 2003

(54) FAST-DRYING RENDERING AND COATING COMPOSITION

(75) Inventors: Hans-Peter Weitzel, Reischach (DE); Harald Zeh, Burghausen (DE); Peter Ball, Emmerting (DE); Klaus Marquardt, Seebruck (DE)

(73) Assignee: Wacker-Chemie GmbH, Munich (DE)

(*) Notice: Subject to any disclaimer, the term of this patent is extended or adjusted under 35 U.S.C. 154(b) by 0 days.

(21) Appl. No.: 09/518,894

(22) Filed: Mar. 6, 2000

(30) Foreign Application Priority Data

Mar. 10, 1999 (DE) .......................... 199 10 602

(51) Int. Cl.$^7$ ................................. C08K 3/00
(52) U.S. Cl. .................. 524/501; 524/253; 523/216
(58) Field of Search ................ 524/501, 253; 523/216

(56) References Cited

U.S. PATENT DOCUMENTS

| | | | |
|---|---|---|---|
| 3,799,902 A | | 3/1974 | Anderson |
| 3,892,822 A | * | 7/1975 | Frechtling .................. 260/875 |
| 4,082,884 A | | 4/1978 | De Long |
| 4,154,923 A | * | 5/1979 | Braun ........................ 528/485 |
| 4,214,039 A | | 7/1980 | Steiner et al. |
| 4,273,833 A | | 6/1981 | De Long |
| 4,569,694 A | | 2/1986 | Spitz et al. |
| 4,581,395 A | * | 4/1986 | Nakaya ...................... 523/410 |
| 5,567,750 A | | 10/1996 | Schulze et al. |
| 5,643,672 A | * | 7/1997 | Marchi ....................... 428/402 |
| 5,705,553 A | * | 1/1998 | Kuropka .................... 524/459 |
| 6,046,277 A | * | 4/2000 | Kolter ........................ 525/205 |
| 6,063,861 A | | 5/2000 | Irle et al. |
| 6,063,865 A | | 5/2000 | Ball et al. |
| 6,075,075 A | * | 6/2000 | Dragon .......................... 524/2 |
| 6,171,505 B1 | * | 1/2001 | Maury ........................ 210/727 |
| 6,262,167 B1 | * | 7/2001 | Weitzel ...................... 524/513 |

FOREIGN PATENT DOCUMENTS

| | | |
|---|---|---|
| DE | 44 26 236 | 1/1996 |
| DE | 197 11 741 | 9/1998 |
| DE | 197 32 774 | 2/1999 |
| DE | 198 52 874 | 5/2000 |
| DE | 198 53 973 | 7/2000 |
| EP | 0 200 249 | 12/1986 |
| EP | 0 409 459 | 7/1990 |
| EP | 0 441 037 | 8/1991 |
| EP | 0 632 096 | 1/1995 |
| EP | 0 661 306 | 7/1995 |
| EP | 0 721 004 | 7/1996 |
| EP | 0728822 | 8/1996 |
| EP | 0 798 350 | 10/1997 |
| EP | 0 811 663 | 12/1997 |
| EP | 0 832 949 | 4/1998 |
| EP | 0 866 102 | 9/1998 |
| EP | 0 894 821 | 2/1999 |
| EP | 0 894 822 | 2/1999 |
| EP | 0 896 029 | 2/1999 |
| EP | 0 919 579 | 6/1999 |
| FR | 1082926 | 6/1954 |
| FR | 1082926 | 1/1955 |
| FR | 2165881 | 8/1973 |
| FR | 2324699 | 4/1977 |
| GB | 726466 | 3/1955 |
| WO | 90/10677 | 9/1990 |
| WO | 94/20661 | 9/1994 |
| WO | 99/14275 | 3/1999 |

OTHER PUBLICATIONS

Derwent Abstract corresponding to EP 0 866 102 AZ (AN 1998–458039).
Derwent Abstract corresponding to FR 2,165,881 [AN 1973–64326U].
Derwent Abstract corresponding to DE 44 26 236 [An 1996–078130].
Derwent Abstract corresponding to DE 197 32 774 [AN 1999–133235].
Derwent Abstract corresponding to EP 0 896 029 [AN 1999–122267].
Derwent Abstract corresponding to DE 197 11 741.
Derwent Abstract corresponding to EP 0 661 306 [An 1995–232641].
Derwent Abstract corresponding to EP 0 894 821 [AN 1999–108320].
A.L.Rutherford: "Speciality Carbonates for Water–Borne Coating", pp. 266–276 (Symp., London 28–29, Sep. 88).
Patent Abstracts of Japn, vol. 010, No. 377 (C–392) Dec. 16, 1986. (Corresponding to JP 61 168681/Hoechst Gosei).
Plasdoc—Central Patents Index—Basic Abstracts Journal, Sect. A, vol. 95, No. 33 (Corresponding to JP 0 715 7565).
European Search Report.
Derwent Abstract corresponding to DE 197 32 774 [AN 1999–133235].
Derwent Abstract corresponding to DE 44 26 236 [AN 1996–078130].
Derwent Abstract corresponding to EP 0 661 306 [AN 1995–232641].
Derwent Abstract corresponding to FR 2 165 881 [AN 1973–64326U].
A.L. Rutherford: "Speciality Carbonates for Water–borne Coatings", Sep. 28/29, 1988, pp. 266–276, XP002135571.
European Search Report.
Derwent Abstract corresponding to DE–A 198 52874 [AN 2000–401005].
Derwent Abstract corresponding to DE–C 198 53973 [AN 2000–378172].

* cited by examiner

*Primary Examiner*—Edward J. Cain
(74) *Attorney, Agent, or Firm*—Brooks & Kushman P.C.

(57) ABSTRACT

The invention relates to a fast-drying rendering and coating composition comprising a binder in the form of an aqueous polymer dispersion or of a water-redispersible polymer powder, and also an organic precipitant, if desired in combination with an inorganic precipitant.

15 Claims, No Drawings

FAST-DRYING RENDERING AND COATING COMPOSITION

BACKGROUND OF THE INVENTION

1) Field of the Invention

The invention relates to fast-drying rendering and coating compositions, and also to a concentrate for preparing compositions of this type.

2) Background Art

Conventional coating compositions dry very slowly, particularly in the fall and in winter, and this may significantly delay subsequent operations. Solutions to this problem described in the prior art use coating compositions which rapidly form a surface film allowing the next layer of render to be applied at an early stage.

EP-A 866102 describes fast-drying coating compositions based on an aqueous synthetic-polymer dispersion which also has a salt content to lower the freezing point and chemical crosslinking agents, if desired in combination with UV crosslinking agents.

EP-A 200249 describes a method for preparing fast-drying road-marking paints, in which an aqueous synthetic-polymer emulsion paint with a high filler content is applied to the road and salt is then sprinkled on.

European Patent Applications EP-A 811663, EP-A 798350 and EP-A 409459 disclose fast-drying paints for road marking which comprise an aqueous synthetic-polymer dispersion and amine-functional copolymers.

The prior-art solutions have the disadvantage that either complicated mixes or highly specific agents have to be used.

The object was therefore to develop a coating composition which dries rapidly and on which, therefore, further work can be carried out at an early stage, using a mix which is as user-friendly and uncomplicated as possible.

SUMMARY OF THE INVENTION

The invention provides a fast-drying rendering and coating composition comprising a binder in the form of an aqueous polymer dispersion or of a water-redispersible polymer powder, and also an organic precipitant, if desired, in combination with an inorganic precipitant.

The binders used may comprise any commonly used aqueous polymer dispersions or water-redispersible polymer powders of any conventional resin type. Redispersible means that the agglomerates obtained after drying break down into the primary particles again when added to water, and these are then dispersed in the water. Suitable polymers are those based on one or more monomers selected from the group including vinyl esters of unbranched or branched alkylcarboxylic acids having from 1 to 15 carbon atoms, methacrylates and acrylates of alcohols having from 1 to 10 carbon atoms, vinyl aromatics, olefins, dienes and vinyl halides. It is also possible to use mixtures of the polymers mentioned.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having from 5 to 11 carbon atoms, such as VeoVa5®, VeoVa9®, VeoVa10® or VeoVa11®. Preferred methacrylates or acrylates are methyl acrylate, methyl methacrylate, ethyl acrylate, ethyl methacrylate, propyl acrylate, propyl methacrylate, n-butyl acrylate, n-butyl methacrylate and 2-ethylhexyl acrylate.

Preferred vinyl aromatics are styrene, methylstyrene and vinyltoluene. The preferred vinyl halide is vinyl chloride. The preferred olefins are ethylene and propylene, and the preferred dienes are 1,3-butadiene and isoprene.

Preference is given to polymers which also contain, based on the total weight of the polymer, from 0.1 to 8% by weight of one or more ethylenically unsaturated, carboxyl-containing monomers. Suitable ethylenically unsaturated carboxyl-containing monomers are ethylenically unsaturated mono- or dicarboxylic acids, such as acrylic acid, methacrylic acid, maleic acid, fumaric acid and itaconic acid. The content of carboxyl-containing comonomer units is preferably from 0.3 to 4% by weight, based on the total weight of the copolymer.

The polymers may, if desired, also contain from 0.01 to 10.0% by weight, based on the total weight of the copolymer, of auxiliary monomers selected from the group consisting of the ethylenically unsaturated carboxamides, preferably acrylamide, selected from the group consisting of the ethylenically unsaturated sulfonic acids and salts of these, preferably vinylsulfonic acid, selected from the group consisting of comonomers with more than one ethylenic unsaturation, for example divinyl adipate, diallyl maleate, allyl methacrylate or triallyl cyanurate and/or selected from the group consisting of the N-methylol(meth)acrylamides and ethers of these, such as isobutoxy or n-butoxy ethers.

Particularly preferred polymers are the following. The data are given in percent by weight, where appropriate, with the proportion of carboxyl-containing comonomer units, and give 100% by weight in total: from the vinyl ester polymer group, vinyl acetate polymers, vinyl acetate-ethylene copolymers with an ethylene content of from 1 to 60% by weight; vinyl ester-ethylene-vinyl chloride copolymers with an ethylene content of from 1 to 40% by weight and a vinyl chloride content of from 20 to 90% by weight; vinyl acetate copolymers with from 1 to 50% by weight of one or more copolymerizable vinyl esters, such as vinyl laurate, vinyl pivalate, vinyl esters of an alpha-branched carboxylic acid, in particular vinyl versatates (VeoVa9®, VeoVa10®, VeoVa11®), which where appropriate, also contain from 1 to 40% by weight of ethylene; vinyl acetate-acrylate copolymers with from 1 to 60% by weight of acrylate, in particular, n-butyl acrylate or 2-ethylhexyl acrylate, where appropriate, also containing from 1 to 40% by weight of ethylene. From the (meth)acrylate polymer group, polymers of n-butyl acrylate or 2-ethylhexyl acrylate; copolymers of methyl methacrylate with n-butyl acrylate and/or 2-ethylhexyl acrylate and copolymers of methyl methacrylate with 1,3-butadiene. From the vinyl chloride polymer group, in addition to the abovementioned vinyl ester-vinyl chloride-ethylene copolymers, vinyl chloride-ethylene copolymers and vinyl chloride-acrylate copolymers.

From the styrene polymer group, styrene-butadiene copolymers and styrene-acrylate copolymers, such as styrene-n-butyl acrylate or styrene-2-ethylhexyl acrylate with a styrene content of from 10 to 70% by weight in each case.

The polymers are prepared in a manner known per se, preferably by emulsion polymerization, for example as described in WO-A 94/20661, the relevant disclosure of which is incorporated into the present application by way of reference. It is also possible to use emulsifier-stabilized dispersions or protective-colloid-stabilized dispersions. Preference is given to polymers free from protective colloids. To prepare the powders, the resultant polymer dispersion is dried. The drying may take place by spray drying or freeze drying, or by coagulating the dispersion followed by fluidized-bed drying. Spray drying is preferred.

The binder is generally used in the form of an aqueous polymer dispersion or of a water-redispersible polymer powder, in amounts of from 5 to 15% by weight, preferably from 0.1 to 8% by weight, of polymer, based in each case on the coating composition.

Suitable organic precipitants are polymers selected from the group consisting of the polyethyleneimines and low-molecular-weight di-, tri- and tetramines with a molecular weight which is generally up to 200. Suitable low-molecular weight di-, tri- and tetramines are hexamethylenediamine, diaminotetramethylcyclohexane, 1,3-bis-aminomethylbenzene, diethylenetriamine, triethylenetriamine and tetraethylenetetramine. Preference is given to polyethyleneimines, in particular those with an average molecular weight Mw of from $1 \cdot 10^5$ to $2 \cdot 10^6$, particularly those with an average molecular weight Mw of from $7.5 \cdot 10^5$ to $1.2 \cdot 10^6$, most preferably those with a Brookfield viscosity (20° C., 30% solids content) of from 150 to 350 mPas (Brookfield RVT, ISO 2225, 20° C., 20 rpm, spindle 5). The amount of organic precipitant used, based on the total weight of the coating composition, is generally from 0.01 to 1% by weight, preferably from 0.01 to 0.5% by weight, particularly preferably from 0.015 to 0.1% by weight.

If desired, the organic precipitant may be used in combination with an inorganic precipitant. Suitable inorganic precipitants are water-soluble, colorless salts of metal ions of valency two or above, generally from two to four, and water-soluble means that the solubility in water under standard conditions (23° C., DIN 50014) is at least 10 g/l, with the proviso that the metal salts can be deactivated by forming ammonium complexes, so that the coagulating action does not become effective until the ammonia has evaporated. Mixtures of different inorganic precipitants of the abovementioned type may also be present. Preference is given to metal salts of metals of the second and third main group and of the second and fourth transition group of the Periodic Table, particularly salts of $Al^{3+}$, $Ti^{4+}$, $Zr^{2+}$, $Zn^{2+}$, most preferably those of $Zn^{2+}$. Suitable gegenions are anions of inorganic or organic acids, such as halides, for example chloride, or carbonate, sulfate, phosphate or acetate. Preference is given to anions, such as carbonate or acetate, which have no adverse physical effect on buildings.

Zinc acetate and zinc carbonate are most preferred. The amount of the inorganic precipitant used is from 0.05 to 0.4% by weight, preferably from 0.1 to 0.3% by weight, based on the total weight of the coating composition. Another advantage of zinc salts is that they also act as biocides and contribute to avoidance of biological damage to the finished product (render).

Besides the polymeric binder and the precipitant, the rendering and coating compositions also comprise the usual constituents of mixes, such as fillers, thickeners, water, and also other additives selected from the group including pigments, dispersing agents, antifoams and preservatives. Examples of suitable fillers are sand, calcium carbonate, talc and fibrous fillers. The thickeners usually used are cellulose ethers, phyllosilicates and polyacrylates.

The nature and amount of constituents in mixes or coating compositions are known to the skilled worker. The coating compositions generally comprise, besides the polymer and precipitant, from 25 to 83% by weight of filler, from 0.05 to 1% by weight of thickener, from 1 to 10% by weight of pigment, if desired from 10 to 50% by weight of water, depending on whether the render is paste-like or dry, and other auxiliaries, and the proportions in % by weight in the mixes always give 100% by weight in total. If desired, for example when using an inorganic precipitant, the pH of the coating and rendering compositions is set to an alkaline value, preferably >8, prior to operations involving the same. For this, volatile nitrogen bases are added, preferably ammonia, particularly preferably ammonia in aqueous solution (generally solutions of from 5 to 30% strength).

To prepare fast-drying, paste-like coating compositions, the precipitant and the polymeric binder in the form of its aqueous dispersion or redispersion powder may be blended with the other constituents of the mix. To blend the coating composition, the other constituents of the mix, such as fillers, thickeners, water and the other additives, are mixed in suitable mixers and homogenized.

It is, however, also possible to prepare the fast-drying coating compositions actually in situ on the building site by waiting until this juncture to add the precipitant to the finished mix. This achieves the greatest possible flexibility.

For this, the precipitant may be added in the form of an aqueous or pulverulent concentrate. The aqueous concentrate comprises from 30 to 60% by weight of organic precipitant, from 10 to 40% by weight of aqueous ammonia solution and from 0 to 60% by weight of inorganic precipitant, based in each case on the total weight of the concentrate. The aqueous concentrate is particularly suitable for preparing paste-like rendering and coating compositions.

The precipitant is preferably added in powder form, as a powder concentrate. For this, the organic precipitant and, as appropriate, the inorganic precipitant can be applied to a pulverulent carrier material as in the procedure of EP-A765899. Suitable carrier materials are inorganic or organic solids whose average particle size is generally from 5 nm to 100 μm. Examples of inorganic carrier materials are the oxides of silicon, aluminum and titanium, preferably titanium dioxides, and aluminum silicates, and also silicon dioxides, such as silica gels and silicas, in particular fine-particle silicas, most preferably fine-particle silicas with a BET surface area of from 100 to 400 $m^2/g$ (DIN66131). Examples of organic carrier materials are starch powders, cellulose powders, silicone resins and addition polymers, such as polyvinyl alcohol powders and polystyrene powders, preferably polyvinyl alcohols with a degree of hydrolysis of from 65 to 95 mol % and a Höppler viscosity of from 2 to 15 mPas (4% strength aqueous solution, DIN53015 at 20° C.). Most preference is given to powder concentrates which comprise polyethyleneimine on an inorganic carrier, such as pulverulent silica and/or pulverulent polyvinyl alcohol. The powder concentrate comprises from 10 to 90% by weight, preferably from 20 to 70% by weight, of organic precipitant and, as appropriate, from 0 to 60% by weight of inorganic precipitant, based on the total weight of precipitant and carrier.

To prepare the powder concentrates the procedure is generally that the pulverulent carrier is suspended in the aqueous solution of the organic precipitant or in the organic precipitant itself, and as appropriate, in the aqueous solution of the inorganic precipitant, and then dried. Pulverulent carriers and precipitants are used here in quantity ratios such that the content of precipitant is within the abovementioned range.

The powder concentrate may be admixed with the admixed in this form with the dry render. To prepare cement-free dry renders or pulverulent synthetic-resin renders, the polymeric binder, in the form of a water-redispersible dispersion powder, is mixed with the other constituents of the mix. Preferred mixes for renders comprise from 0.2 to 0.6% by weight of the powder concentrate and from 5 to 15% by weight of polymeric binder, based on the total weight of the render.

The novel coating compositions are suitable for rendering the exteriors of buildings, in particular for rendering composite heat-insulation systems. In this application the novel coating compositions may be used as an undercoat of render or else as an outer render. The coating compositions are suitable for use in thin-layer (particle size <100 μm) systems and also for use in thick-layer systems (particle size up to 1500 μm, DIN EN 13300, 1062-1).

Particularly advantageous embodiments are those in which the precipitant is used in the form of powder concentrates. When a powder concentrate of organic precipitant is used, in particular polyethyleneimine on an inorganic or organic carrier, a simple system is obtained which, without adding inorganic precipitant or base, gives a marked acceleration of setting without odor problems caused by the base.

The following examples serve to describe the invention further.

Coating Composition Mix
(Roughcast Structure, 2.5 mm Grain Size)

| | |
|---|---|
| 7.9 | parts by weight of water |
| 2.0 | parts by weight of preservative |
| 2.0 | parts by weight of polyacrylate dispersing agent (40% strength) |
| 15.0 | parts by weight of inorganic phyllosilicate (5% strength) |
| 30.0 | parts by weight of cellulose thickener (2% strength) |
| 1.0 | part by weight of polyacrylate thickener |
| 5.0 | parts by weight of Lusolvan FBH (filming auxiliary) |
| 5.0 | parts by weight of cellulose fiber |
| 1.0 | part by weight of polyethylene fibrid fibrous filler |
| 30.0 | parts by weight of titanium dioxide |
| 184.1 | parts by weight of polymer (51% strength aqueous dispersion)* |
| 225.0 | parts by weight of calcite (average particle size 50 μm) |
| 170.0 | parts by weight of calcite (average particle size 130 μm) 5.0 |
| 320.0 | parts by weight of marble sand (particle size 1.8–2.5 mm) |
| 2.0 | parts by weight of antifoam |
| 1000.0 | parts by weight in total |

*51% strength aqueous dispersion based on a vinyl acetate-ethylene copolymer, Vinnapas ® LL 3800W from Wacker Polymer Systems.

Comparative Example 1

Coating Composition without Added Precipitant

A mix as listed above was used for a coating composition comprising only polymeric binder, which was used without modification.

Comparative Example 2

Coating Composition with Inorganic Precipitant 0.3% by weight (3 parts by weight) of ammoniacal zinc acetate (50% strength aqueous solution) was added to the abovementioned mix.

Example 3

Coating Composition with Addition of Organic Precipitant 0.3% by weight (3 parts by weight) of polyethyleneimine solution (PolyminP, 50% strength aqueous solution, Mw=7.5·10$^5$, BASF) was added to the abovementioned mix.

Example 4

Coating Composition with Addition of Inorganic and Organic Precipitant 0.3% by weight (3 parts by weight) of polyethyleneimine solution (PolyminP, 50% strength aqueous solution, Mw=7.5·10$^5$, BASF) was added to the abovementioned mix and 0.3% by weight (3 parts by weight) of ammoniacal zinc acetate (50% strength aqueous solution).

Example 5

Coating Composition with Addition of Organic Precipitant

The procedure of Example 3 was followed except that the appropriate amount of a 60% strength aqueous dispersion of a vinyl chloride-ethylene-vinyl laurate copolymer (Vinnapas® CEF 52W from Wacker Polymer Systems) was used instead of the polymer mentioned in Example 3.

Example 6

Coating Composition with Addition of Inorganic and Organic Precipitant

The procedure of Example 4 was followed except that the appropriate amount of a 50% strength aqueous dispersion of a vinyl chloride-ethylene-vinyl acetate copolymer (Vinnapas® CEF 10W from Wacker Polymer Systems) was used instead of the polymer mentioned in Example 4.

Comparative Example 7

Coating Composition without Addition of Precipitant

The procedure of Comparative Example 1 was followed except that the appropriate amount of a 51% strength aqueous dispersion of a vinyl chloride-ethylene-acrylate copolymer (Vinnapas® CEF 50W from Wacker Polymer Systems) was used instead of the polymer mentioned in Example 1.

Comparative Example 8

Coating Composition with Inorganic Precipitant

The procedure of Comparative Example 2 was followed except that the appropriate amount of a 51% strength aqueous dispersion of a vinyl chloride-ethylene-acrylate copolymer (Vinnapas® CEF 50W from Wacker Polymer Systems) was used instead of the polymer mentioned in Example 2.

Example 9

Coating Composition with Addition of Organic Precipitant

The procedure of Example 3 was followed except that the appropriate amount of a 51% strength aqueous dispersion of a vinyl chloride-ethylene-acrylate copolymer (Vinnapas® CEF 50W from Wacker Polymer Systems) was used instead of the polymer mentioned in Example 3.

Example 10

Coating Composition with Addition of Inorganic and Organic Precipitant

The procedure of Example 4 was followed except that the appropriate amount of a 51% strength aqueous dispersion of a vinyl chloride-ethylene-acrylate copolymer (Vinnapas® CEF 50W from Wacker Polymer Systems) was used instead of the polymer mentioned in Example 4.

Example 11

Coating Composition with Addition of Organic Precipitant

The procedure of Example 3 was followed except that the appropriate amount of a 50% strength aqueous dispersion of a vinyl acetate-ethylene-VeoVa10 copolymer (Vinnapas® LL3523W from Wacker Polymer Systems) was used instead of the polymer mentioned in Example 3.

Example 12

Coating Composition with Addition of Organic Precipitant

The procedure of Example 3 was followed except that the appropriate amount of a 50% strength aqueous redispersion of a redispersion powder based on a vinyl acetate-ethylene copolymer (Vinnapas® HH/B 953 from Wacker Polymer Systems) was used instead of the dispersion mentioned in Example 3.

Example 13

Coating Composition with Addition of Organic Precipitant

The procedure of Example 3 was followed except that the appropriate amount of a 50% strength aqueous redispersion of a redispersion powder based on a vinyl chloride-ethylene-vinyl laurate copolymer was used instead of the dispersion mentioned in Example 3.

Example 14

Coating Composition with Addition of Organic Precipitant on Inorganic Carrier The procedure of Example 3 was followed except that 0.3% by weight of a pulverulent polyethyleneimine concentrate was used instead of 0.3% by weight of polyethyleneimine solution.

To prepare the powder concentrate, 30 parts by weight of a fine-particle pulverulent silica (HDK V15 from Wacker) was suspended in 70 parts by weight of polyethyleneimine, and the suspension was dried.

Example 15

Coating Composition with Addition of Organic Precipitant on Organic Carrier The procedure of Example 13 was followed except that 7 parts by weight of a 50% strength aqueous polyethyleneimine solution were mixed with 93 parts by weight of a 10% strength polyvinyl alcohol solution (degree of hydrolysis 71 mol %, Höppler viscosity 4.5 mPas) and the mixture was then spray-dried.

Drying Performance Tests
Specimen Preparation

The coating compositions obtained in the comparative examples and examples were applied to a board at a layer thickness of 2.5 mm, using a trowel. The coating composition, substrate and tools were precooled to +6° C. Immediately after application, the coated specimen boards were stored in a (Weiss Umwelttechnik) conditioning cabinet under the drying conditions given.

Drying Conditions A
Storage for 6 hours at +6° C. and 95% relative humidity. The air velocity at the coating surface was 0 m/s.

Drying Conditions Cycle B
Drying cycle (total time 29 h) composed of 4 h of storage at +6° C., 3 h of cooling from +6 to −5° C., 10 h of storage at −5° C., 3 h of warming from −5 to +6° C. and 9 h of storage at +6° C.

Drying Conditions Cycle C
Drying cycle (total time 24 h) composed of 4 h of storage at +6° C., 3 h of cooling from +6 to −5° C., 10 h of storage at −5° C., 3 h of warming from −5 to +6° C. and 4 h of storage at +6° C.

Drying Conditions Cycle D
Drying cycle (total time 16 h) composed of 4 h of storage at +6° C., 1 h of cooling from +6° C. to −5° C., 6 h of storage at −5° C., 1 h of warming from −5 to +6° C. and 4 h of storage at +6° C.

A spray jet (specified water pressure) was then used to spray the render layer until the render began to break away. The greater the time before the render begins to break away, the more solidified has the surface of the system become, i.e. the shorter is the delay before further operations can be carried out on the same. The numerical measure used was the time elapsed before the render began to break away. For each (comparative) example two measurements were carried out. The results are given in Tables 1 to 3.

The results show that organic precipitant on its own significantly accelerates the drying-out of the render at low temperatures. Using inorganic precipitant on its own the acceleration achieved is only very small. The combination of inorganic and organic precipitant, in contrast, gives a dramatic acceleration of drying-out, with the result that the time over which the novel coating system withstands the water jet is significantly longer than for the coatings of the comparative examples.

TABLE 1

Drying conditions A

| Example | $t_1$ [min] | $t_2$ [min] |
|---|---|---|
| Comparative Example 1 | 0 | 0 |
| Comparative Example 2 | <1 | <1 |
| Example 3 | 1.0 | 1.5 |
| Example 4 | 1.5 | 4.0 |
| Example 14 | 2.0 | 3.0 |

TABLE 2

Drying conditions A

| Example | $t_1$ [min] | $t_2$ [min] |
|---|---|---|
| Example 5 | 1.0 | 1.0 |
| Example 6 | 4.0 | 1.0 |
| Comparative Example 7 | 0 | 0 |
| Comparative Example 8 | <1 | <1 |
| Example 9 | 4.0 | 1.5 |
| Example 10 | 4.0 | 2.0 |

TABLE 3

Drying conditions cycles B, C and D

| Example | Cycle B $T_B$ [min] | Cycle C $T_C$ [min] | Cycle D $T_D$ [min] |
|---|---|---|---|
| Comparative Example 1 | <1 | <1 | <1 |
| Comparative Example 2 | 8 | 3 | <1 |
| Example 3 | 8 | 4 | 1 |

TABLE 3-continued

Drying conditions cycles B, C and D

| Example | Cycle B $T_B$ [min] | Cycle C $T_C$ [min] | Cycle D $T_D$ [min] |
|---|---|---|---|
| Example 4 | >10 | >10 | 8 |
| Example 14 | 7–8 | | |

What is claimed is:

1. A fast-drying, water-resistant render or coating composition, comprising a binder in the form of an aqueous polymer dispersion or of a water-redispersible polymer powder, and an organic precipitant, optionally in combination with an inorganic precipitant,
wherein said organic precipitant comprises at least one polyethyleneimine.

2. The fast-drying rendering and coating composition as claimed in claim 1, wherein the polymers present comprise polymers based on one or more monomers selected from the group including vinyl esters of unbranched or branched alkylcarboxylic acids having from 1 to 15 carbon atoms, methacrylates and acrylates of alcohols having from 1 to 10 carbon atoms, vinyl aromatics, olefins, dienes and vinyl halides, in amounts of from 5 to 15% by weight of polymer, based on the coating composition.

3. The fast-drying rendering and coating composition as claimed in claim 1 or 2, wherein the polymers also contain from 0.1 to 8% by weight, based on the total weight of the polymer, of one or more ethylenically unsaturated carboxyl-containing monomers.

4. The fast-drying rendering and coating composition as claimed in claims 1 to 3, wherein the organic precipitant present comprises from 0.01 to 1% by weight, based on the total weight of the coating composition.

5. The fast-drying rendering and coating composition as claimed in claims 1 to 4, wherein the inorganic precipitant present comprises a metal salt of metals of the second or third main group or of the second or fourth transition group of the Periodic Table.

6. The fast-drying rendering and coating composition as claimed in claims 1 to 4, wherein the inorganic precipitant present comprises a metal salt selected from the group consisting of the halides, carbonates, sulfates, phosphates and acetates of $Al^{3+}$, $Ti^{4+}$, $Zr^{2+}$ and $Zn^{2+}$.

7. The fast-drying rendering and coating composition as claimed in claims 1 to 4, wherein the organic precipitant and, as appropriate, the inorganic precipitant have been applied to carrier materials selected from the group consisting of inorganic and organic solids with an average particle size of from 5 nm to 100 $\mu$m.

8. A process for preparing rendering and coating compositions as claimed in claims 1 to 7, where the polymeric binder in the form of its aqueous dispersion or dispersion powder and the precipitant are blended with the other constituents of the mix.

9. The process as claimed in claim 8, where, to prepare rendering and coating compositions, the precipitant is added in the form of an aqueous or pulverulent concentrate.

10. The process as claimed in claim 9, where, to prepare paste-like renders and coating compositions, the precipitant is added in the form of an aqueous concentrate with from 30 to 60% by weight of organic precipitant, from 10 to 40% by weight of aqueous ammonia solution and from 0 to 60% by weight of inorganic precipitant.

11. The process as claimed in claim 7, where, to prepare cement-free dry renders or pulverulent synthetic resin renders, the polymeric binder, in the form of a water-redispersible dispersion powder, and the precipitant are admixed after being applied to a pulverulent carrier material.

12. The process as claimed in claim 10 or 11, where the organic precipitant and, as appropriate, the inorganic precipitant have been applied to a carrier material selected from the group consisting of silica gels and silicas, and also polyvinyl alcohols with a degree of hydrolysis of from 65 to 95 mol % and with a Höppler viscosity of from 2 to 15 mPas.

13. The process of claim 10, further comprising applying said organic precipitant, and said inorganic precipitant when present, to a carrier material selected from the group consisting of silica gels, silicas, and polyvinyl alcohols with a degree of hydrolysis of from 65 to 95 mol percent and having a Höppler viscosity of from 2 to 15 mPas.

14. A process for rendering the exterior of a building, comprising coating at leas portion of said building with the composition of claim 1.

15. In a process for the preparation of composite heat-insulation systems wherein a render is employed as a coating, the improvement comprising applying as said render the composition of claim 1.

* * * * *

UNITED STATES PATENT AND TRADEMARK OFFICE
CERTIFICATE OF CORRECTION

PATENT NO. : 6,531,538 B1
DATED : March 11, 2003
INVENTOR(S) : Hans-Peter Weitzel et al.

It is certified that error appears in the above-identified patent and that said Letters Patent is hereby corrected as shown below:

Column 9,
Line 18, delete Claim 2 and insert therefor:
-- 2. A fast drying rendering and coating composition according to claim 1 in combination with an inorganic precipitant. --

Line 28, delete Claim 3 and insert therefor:
-- 3. The fast-drying rendering and coating composition as claimed in claim 1, wherein the polymers also contain from 0.1 to 8% by weight, based on the total weight of the polymer, of at least one ethylenically unsaturated carboxyl-containing monomer. --

Line 37, delete Claim 4 and insert therefor:
-- 4. Th fast-drying rendering and coating composition as claimed in claim 1, wherein the organic precipitant present comprisies from 0.01 to 1% by weight, based on the total weight of the coating compositions. --

Line 37, delete Claim 5 and insert therefor:
-- 5. The fast-drying rendering and coating composition as claimed in claim 1, wherein the inorganic precipitant present comprises a metal salt of metals selected from the group consisting of the second or third main group and the second or fourth transition group of the Periodic Table. --

Line 42, delete Claim 6 and insert therefor:
-- 6. The fast-drying rendering and coating composition as claimed in claim 1, wherein the inorganic precipitant present comprises a metal salt selected from the group consisting of the halides, carbonates, sulfates, phosphates and acetates of $Al^{3+}$, $Ti^{4+}$, $Zr^{2+}$ and $Zn^{2+}$. --

Column 10,
Line 1, delete Claim 7 and insert therefor:
-- 7. The fast-drying rendering and coating composition as claimed in claim 1, wherein the organic precipitant and the inorganic precipitant have been applied to carrier materials selected from the group consisting of inorganic and organic solids with an average particle size of from 5 nm to 100 $\mu$m. --

Line 7, delete Claim 8 and insert therefor:
-- 8. A process for preparing rendering and coating compositions as claimed in claim 1, wherein the polymeric binder in the form of its aqueous dispersion or dispersion powder and the precipitant are blended with the other constituents of the mix. --

UNITED STATES PATENT AND TRADEMARK OFFICE
CERTIFICATE OF CORRECTION

PATENT NO. : 6,531,538 B1
DATED : March 11, 2003
INVENTOR(S) : Hans-Peter Weitzel et al.

It is certified that error appears in the above-identified patent and that said Letters Patent is hereby corrected as shown below:

<u>Column 9 (cont'd)</u>,
Line 12, delete Claim 9 and insert therefor:
-- 9.   The process of claim 8, wherein the precipitant is added on the form of an aqueous or pulverulent concentrate. --

<u>Column 10</u>,
Line 15, delete Claim 10 and insert therefor:
-- 10.   The process as claimed in claim 9, wherein, in the preparation of the paste-like renders and coating compositions, the precipitant is added in the form of an aqueous concentrate with from 30 to 60% by weight of organic precipitant, from 10 to 40% by weight of aqueous ammonia solution and from 0 to 60% by weight of inorganic precipitant. --

Line 21, delete Claim 11 and insert therefor:
-- 11.   The process as claimed in claim 7, wherein, in the preparation of cement-free dry renders or pulverulent synthetic resin renders, the polymeric binder, in the form of a water-redispersible dispersion powder, and the precipitant are admixed after being applied to a pulverulent carrier material. --

Line 26, delete Claim 12 and insert therefor:
-- 12.   The process as claimed in claim 9, wherein the organic precipitant and the inorganic precipitant have been applied to a carrier material selected from the group consisting of silica gels and silicas, and also polyvinyl alcohols with a degree of hydrolysis of from 65 to 95 mol% and with a Höppler viscosity of from 2 to 16 mPas. --

Signed and Sealed this

Ninth Day of March, 2004

JON W. DUDAS
*Acting Director of the United States Patent and Trademark Office*